(12) United States Patent
Zhu et al.

(10) Patent No.: US 11,602,851 B2
(45) Date of Patent: Mar. 14, 2023

(54) METHOD AND DEVICE FOR CONTROLLING A GREAT NUMBER OF ROBOTS TO EMERGENTLY STOP

(71) Applicant: ZHEJIANG LIBIAO ROBOTS CO., LTD., Hangzhou (CN)

(72) Inventors: Jianqiang Zhu, Hangzhou (CN); Juejing Xu, Hangzhou (CN)

(73) Assignee: ZHEJIANG LIBIAO ROBOTS CO., LTD., Zhejiang (CN)

( * ) Notice: Subject to any disclaimer, the term of this patent is extended or adjusted under 35 U.S.C. 154(b) by 782 days.

(21) Appl. No.: 16/068,052

(22) PCT Filed: Dec. 27, 2016

(86) PCT No.: PCT/CN2016/112284
§ 371 (c)(1),
(2) Date: Jul. 22, 2020

(87) PCT Pub. No.: WO2017/118316
PCT Pub. Date: Jul. 13, 2017

(65) Prior Publication Data
US 2020/0346348 A1    Nov. 5, 2020

(30) Foreign Application Priority Data
Jan. 4, 2016    (CN) .......................... 201610004679.0

(51) Int. Cl.
*G05D 1/00* (2006.01)
*G05D 1/02* (2020.01)
(Continued)

(52) U.S. Cl.
CPC ........... *B25J 9/1676* (2013.01); *B25J 9/0084* (2013.01); *B25J 9/163* (2013.01); *B25J 9/1682* (2013.01);
(Continued)

(58) Field of Classification Search
CPC ........ B25J 9/1676; B25J 9/0084; B25J 9/163; B25J 9/1682; B25J 9/162; B25J 9/1602;
(Continued)

(56) References Cited

U.S. PATENT DOCUMENTS 4,926,103 A     5/1990  Summerville et al.
9,152,149 B1 *  10/2015 Palamarchuk .......... G06F 16/29
(Continued)

FOREIGN PATENT DOCUMENTS

CN    103268111 A    8/2013
CN    103389486 A    11/2013
(Continued)

OTHER PUBLICATIONS

English Abstract of Chinese Application CN103268111A.
(Continued)

*Primary Examiner* — Abby Y Lin
*Assistant Examiner* — Danielle Marie Jackson
(74) *Attorney, Agent, or Firm* — Billion & Armitage

(57) ABSTRACT

A method and a device for controlling a number of robots to emergency stop are provided. The method includes arranging multiple position points in a site where robots work and position identifiers corresponding to the position points, and providing corresponding recognizers at bottoms of the robots; when fault signals reported by the robots are detected, determining, according to the fault signals, whether all the robots in the site need to be controlled to emergency stop, wherein if yes, according to current positions and moving speeds of the robots, position points in the site are allocated to the robots as respective emergency stop positions, the robots are controlled to move to the corresponding emergency stop positions, and thereafter the robots are controlled to stop movement. The device comprises a (Continued)

configuration module, a determination module, an allocation module and a control module.

12 Claims, 3 Drawing Sheets

(51) Int. Cl.
  *B25J 9/16* (2006.01)
  *B25J 9/00* (2006.01)

(52) U.S. Cl.
  CPC ......... *G05D 1/0055* (2013.01); *G05D 1/0291* (2013.01); *G05B 2219/31003* (2013.01); *G05B 2219/31006* (2013.01)

(58) Field of Classification Search
  CPC ........ B25J 9/1664; B25J 9/1674; B25J 11/00; G05D 1/0055; G05D 1/0291; G05B 2219/31003; G05B 2219/31006; G05B 2219/49298; G05B 19/41895; Y02P 90/02; Y02P 90/60
  See application file for complete search history.

(56) References Cited

U.S. PATENT DOCUMENTS

| | | | |
|---|---|---|---|
| 2007/0142967 A1* | 6/2007 | Volcic | B25J 9/1674 700/245 |
| 2015/0266182 A1* | 9/2015 | Strandberg | B25J 9/1666 700/255 |

FOREIGN PATENT DOCUMENTS

| | | | |
|---|---|---|---|
| CN | 103885444 | A | 6/2014 |
| CN | 104199450 | A | 12/2014 |
| CN | 105459117 | A | 4/2016 |
| EP | 1972415 | A1 | 9/2008 |
| JP | H032908 | A | 1/1991 |
| JP | 2814162 | B2 | 10/1998 |
| JP | 2009215032 | A | 9/2009 |
| JP | 2012-216151 | A | 11/2012 |
| JP | 2012223847 | A | 11/2012 |
| KR | 20100068588 | A | 6/2010 |
| KR | 101375340 | B1 * | 3/2014 |

OTHER PUBLICATIONS

English Translation of the International Search Report for PCTCN2016112284, dated Mar. 8, 2017.
English Translation of Chinese Office Action for Priority Application CN2016100004679.
First Search Report for Chinese Priority Application CN2016100046790.
Chinese Office Action for Priority Application CN2016100004679.
Notification to Grant Patent Right for Invention for Chinese Priority Application CN2016100046790.
English Translation of Notification to Grant Patent Right for Invention for Chinese Priority Application CN2016100046790.
Written Opinion of the International Search Authority for PCTCN2016112284, dated Mar. 8, 2017.
English Abstract of Chinese Application CN103389486A.
English Abstract of Chinese Application CN103885444A.
English Abstract of Chinese Application CN104199450.
English Abstract of Chinese Application CN105459117A.
English Abstract of Japanese Application JP2012216151A.
Extended European Search report dated Sep. 26, 2018 for EP Application No. 16883441.4.

* cited by examiner

METHOD AND DEVICE FOR CONTROLLING A GREAT NUMBER OF ROBOTS TO EMERGENTLY STOP

CROSS REFERENCE TO RELATED APPLICATIONS

The present application is a National Stage Application of PCT/CN2016/112284, filed on Dec. 27, 2016, which claims benefit of the priority of Chinese patent application No. CN201610004679.0, entitled "Method and device for controlling lots of robots to stop emergently", which application was filed with the Chinese Patent Office on Jan. 4, 2016, and the entire contents of which are incorporated herein by reference.

TECHNICAL FIELD

The present disclosure relates to the field of robot control, and particularly to a method and a device for controlling a number of robots to emergency stop.

BACKGROUND ART

With the booming of Internet of Things, more and more automatic robots participate in the field of logistics. The automatic robot can replace manpower to perform work such as article transportation, carriage, sorting, storage and packaging, and with the automatic robot, the service level of the logistics industry can be remarkably improved. The logistics industry has become the second-largest application field of robots, following the automobile industry.

In the prior art, when the robot is used in a logistic center to carry out article transportation, sorting and packaging, a number of robots generally will be provided in a site, a fixed moving route is set for each robot, and the robots are controlled to move along respective moving routes, so as to ensure that all the robots work in order in the site. In a working process, if moving faults occur to certain robots, for example, the moving route is deviated from a preset route, or faults occur to a moving mechanism, the faulty robot may collide with other robots, and then mutual collision between the great number of robots in the site may be incurred.

However, in the prior art, there is no good solution as to how to avoid the problem of mutual collision between the great number of robots due to fault of certain robots.

SUMMARY

In view of this, the present disclosure provides a method and a device for controlling a number of robots to emergency stop, which can control, when faults occur to certain robots in a site, all the robots in the site to emergency stop, thus preventing the faulty robots from colliding with other robots, and further avoiding mutual collision between the great number of robots in the site.

In a first aspect, embodiments of the present disclosure provide a method for controlling a number of robots to emergency stop, and the method includes:

arranging multiple position points in a site where the robots work, configuring position identifiers respectively for the multiple position points, and providing a recognizer configured for recognizing the position identifier at a bottom of each robot; and monitoring working situations of the robots in the site, and judging, when a fault signal reported by the robot(s) is detected, whether all the robots in the site need to be controlled to emergency stop, according to the fault signal, wherein if yes, a current position and a moving speed of each of the robots are detected, and each of the robots is allocated with a position point in the site as a respective emergency stop position according to the current position and the moving speed of each of the robots, and each of the robots is controlled to move to a corresponding emergency stop position, and each of the robots is controlled to stop movement after the robot moves to the corresponding emergency stop position.

In combination with the first aspect, embodiments of the present disclosure provide a first possible implementation of the first aspect, wherein the step of judging whether all the robots in the site need to be controlled to emergency stop according to the fault signal includes:

looking up for a processing mode corresponding to the fault signal in a preset fault processing list; and determining, when the found processing mode is a mode for emergency stopping all the robots in the site, that all the robots in the site need to be controlled to emergency stop.

In combination with the first aspect, embodiments of the present disclosure provide a second possible implementation of the first aspect, wherein the step of allocating a position point in the site for each of the robots as a respective emergency stop position according to the current position and the moving speed of each of the robots includes:

determining a first emergency stop range of a current robot according to a preset radius, with a current position of the current robot as a center of circle; and searching in the first emergency stop range to determine whether there are spare position points, wherein if yes, time periods for the current robot to move respectively to the spare position points are analyzed according to the moving speed of the current robot, and a spare position point needing shortest time period is selected as the emergency stop position of the current robot, and if not, the first emergency stop range is enlarged according to a set size, and the searching and analyzing actions are repeated for the enlarged first emergency stop range, until the emergency stop position of the current robot is determined.

In combination with the first aspect, embodiments of the present disclosure provide a third possible implementation of the first aspect, wherein the step of controlling each of the robots to move to a corresponding emergency stop position includes:

calculating a moving direction and a moving distance of the current robot with respect to the corresponding emergency stop position; and determining a direction adjustment angle of the current robot according to the moving direction, and controlling the robot to move to the corresponding emergency stop position according to the direction adjustment angle and the moving distance.

In combination with any one of the first aspect and the first to the third possible implementations of the first aspect, embodiments of the present disclosure provides a fourth implementation of the first aspect, wherein before each of the robots is controlled to stop movement, the method further includes:

receiving position information returned by the current robot after moving to the corresponding emergency stop position;

calculating a distance between the current robot and the position identifier of the corresponding emergency stop position according to the position information; and adjusting a position of the current robot according to the distance, until the recognizer at the bottom of the current robot coincides with the position identifier of the corresponding emergency stop position.

In a second aspect, embodiments of the present disclosure provide a device for controlling a number of robots to emergency stop, wherein the device includes:

a configuration module, configured to arrange multiple position points in a site where the robots work, configure position identifiers respectively for the multiple position points, and provide a recognizer configured for recognizing the position identifier at a bottom of each robot;

a judgment module, configured to monitor working situations of the robots in the site, and judge, when a fault signal reported by the robot(s) is detected, whether all the robots in the site need to be controlled to emergency stop according to the fault signal;

an allocation module, configured to detect a current position and a moving speed of each of the robots if all the robots in the site need to be controlled to emergency stop, and allocate a position point in the site for each of the robots as a respective emergency stop position according to the current position and the moving speed of each of the robots; and a control module, configured to control each of the robots to move to a corresponding emergency stop position, and control each of the robots to stop movement after the robot moves to the corresponding emergency stop position.

In combination with the second aspect, embodiments of the present disclosure provide a first possible implementation of the second aspect, wherein the judgment module includes:

a look-up unit, configured to look up for a processing mode corresponding to the fault signal in a preset fault processing list; and a determination unit, configured to determine, when the found processing mode is a mode for emergency stopping all the robots in the site, that all the robots in the site need to be controlled to emergency stop.

In combination with the second aspect, embodiments of the present disclosure provide a second possible implementation of the second aspect, wherein the allocation module includes:

a range determination unit, configured to determine a first emergency stop range of the current robot according to a preset radius, with the current position of the current robot as a center of circle;

a searching unit, configured to search in the first emergency stop range to determine whether there are spare position points; and a selection unit, configured to analyze, if there are spare position points, time periods for the current robot to move respectively to the spare position points according to the moving speed of the current robot, and select a spare position point needing shortest time period as the emergency stop position of the current robot, and to enlarge, if there are no spare position points, the first emergency stop range according to a set size, and repeat the searching and analyzing for the enlarged first emergency stop range, until the emergency stop position of the current robot is determined.

In combination with the second aspect, embodiments of the present disclosure provide a third possible implementation of the second aspect, wherein the control module includes:

a calculation unit, configured to calculate a moving direction and a moving distance of the current robot with respect to the corresponding emergency stop position; and a movement control unit, configured to determine a direction adjustment angle of the current robot according to the moving direction, and control the robot to move to the corresponding emergency stop position according to the direction adjustment angle and the moving distance.

In combination with any one of the second aspect and the first to third possible implementations of the second aspect, embodiments of the present disclosure provides a fourth possible implementation of the second aspect, wherein the device further includes:

a receiving module, configured to receive position information returned by the current robot after moving to the corresponding emergency stop position;

a distance calculation module, configured to calculate a distance between the current robot and the position identifier of the corresponding emergency stop position according to the position information; and a position adjustment module, configured to adjust a position of the current robot according to the distance, until the recognizer at the bottom of the current robot coincides with the position identifier of the corresponding emergency stop position.

In the embodiments of the present disclosure, firstly the position points are arranged in the site, then it is judged according to the fault situation of the robots whether all the robots in the site need to emergency stop, and when all the robots in the site need to emergency stop, the position points in the site are allocated for the robots as the emergency stop positions of the robots, and finally the robots are controlled to move to the respective emergency stop positions. By the method and the device of the present examples, when faults occur to certain robots in the site, all the robots in the site can be controlled to emergency stop, thus preventing the faulty robots from colliding with other robots, and further avoiding mutual collision between the great number of robots in the site.

BRIEF DESCRIPTION OF DRAWINGS

In order to more clearly illustrate technical solutions of examples of the present disclosure, figures which are needed for the examples will be introduced briefly below. It should be understood that the figures below merely show some examples of the present disclosure, and therefore should not be considered as limiting the scope. A person ordinarily skilled in the art still can obtain other relevant figures according to these figures, without paying inventive efforts.

DETAILED DESCRIPTION OF EMBODIMENTS

In order to make objects, technical solutions and advantages of examples of the present disclosure clearer, below the technical solutions in the examples of the present disclosure will be described clearly and completely in conjunction with the figures in the examples of the present disclosure. Apparently, some but not all examples of the present disclosure are described. Generally, components in the examples of the present disclosure described and shown in the figures herein can be arranged and designed in different configurations. Therefore, the detailed description below of the examples of the present disclosure provided in the figures is not intended to limit the scope of protection of the present disclosure, but merely represents chosen examples of the present disclosure. Based on the examples of the present disclosure, all the other examples, which a person ordinarily skilled in the art obtains without paying inventive efforts, fall within the scope of protection of the present disclosure.

As there is no good solution in the prior art as to how to avoid the problem of mutual collision between a number of robots due to faults of certain robots, the present disclosure provides a method and a device for controlling a number of robots to emergency stop, by which, when faults occur to certain robots in the site, all the robots in the site can be controlled to emergency stop, thus preventing the faulty robots from colliding with other robots, and further avoiding mutual collision between the great number of robots in the site. Below detailed description is made in combination with Examples.

First Example

Figure 1:
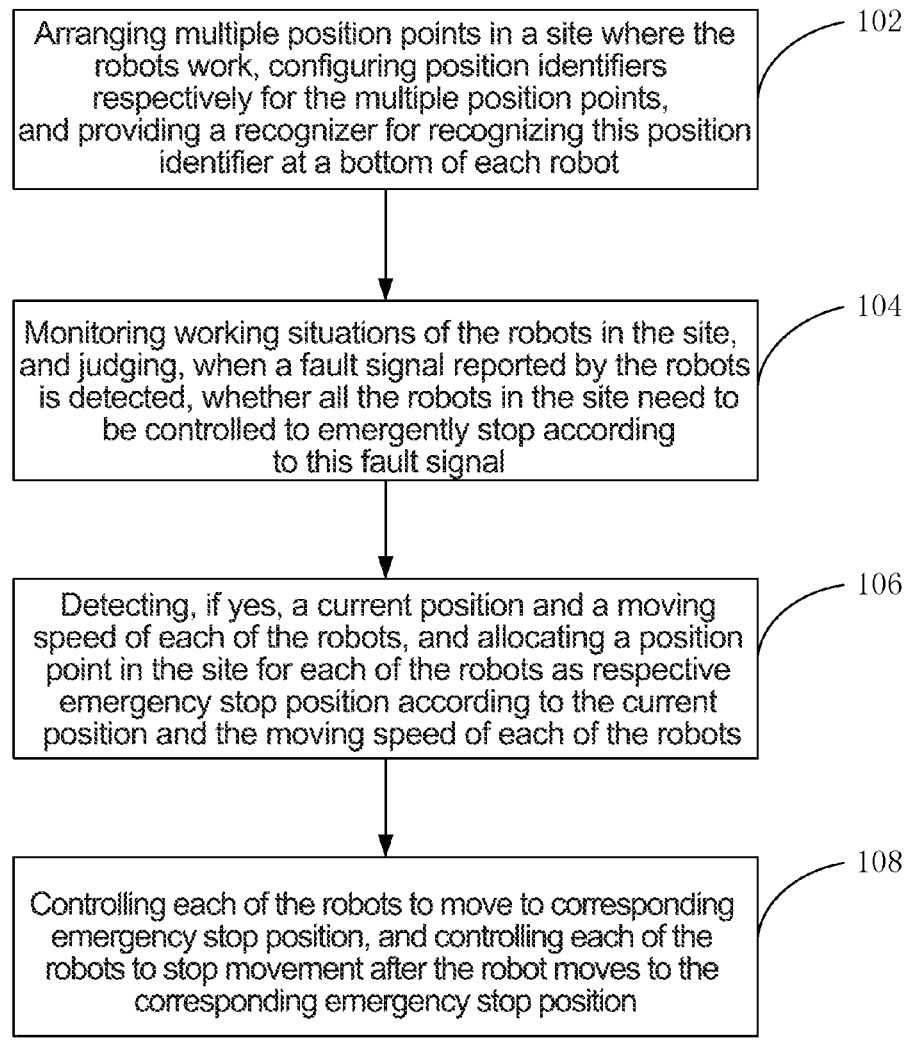
FIG. 1 shows a first flow chart of a method for controlling a number of robots to emergency stop provided in First Example of the present disclosure.

As shown in FIG. 1, First Example of the present disclosure provides a method for controlling a number of robots to emergency stop, and the method at least includes the following steps:

Step 102, arranging multiple position points in a site where the robots work, configuring position identifiers respectively for the multiple position points, and providing a recognizer recognizing the position identifier at a bottom of each robot;

Step 104, monitoring working situations of the robots in the site, and judging, when a fault signal reported by the robot is detected, whether all the robots in the site need to be controlled to emergency stop according to the fault signal;

Step 106, detecting, if yes, a current position and a moving speed of each of the robots, and allocating a position point in the site for each of the robots as a respective emergency stop position according to the current position and the moving speed of each of the robots; and Step 108, controlling each of the robots to move to corresponding emergency stop position, and controlling each of the robots to stop movement after the robot moves to the corresponding emergency stop position.

In the example of the present disclosure, firstly the position points are arranged in the site, then it is judged according to the fault situation of the robots whether all the robots in the site need to emergency stop, and when all the robots in the site need to emergency stop, the position points in the site are allocated for the robots as the emergency stop positions of the robots, and finally the robots are controlled to move to the respective emergency stop positions. By the method of the present example, when faults occur to certain robots in the site, all the robots in the site can be controlled to emergency stop, thus preventing the faulty robots from colliding with other robots, and further avoiding mutual collision between the great number of robots in the site.

An implementation of Step 102 can be as follows: the site where the robots work is divided in a grid form into several grids with an equal area, wherein each grid serves as one position point. An optical identification code is provided in a center of each grid. This optical mark code is the position identifier, and this optical identification code may be a two-dimension code. The bottom of each of the robots is provided with an optical recognizer for recognizing the optical identification code, and the optical recognizer may be a camera.

In Step 104, a server for controlling work of the robots can monitor the working situations of the robots in the site, and judges, when monitoring the fault signal reported by the robot, whether all the robots in the site need to emergency stop according to the fault signal. In the above, the step of judging whether all the robots in the site need to be controlled to emergency stop according to the fault signal includes the following processes: (1) looking up for a processing mode corresponding to the fault signal in a preset fault processing list; (2) determining, when the found processing mode is a mode for emergency stopping all the robots in the site, that all the robots in the site need to be controlled to emergency stop. Specifically, the fault processing list is stored in the server in advance, and this fault processing list indicates different processing modes corresponding to different fault signals. The server looks up, upon receiving the fault signal reported by the robot, in the fault processing list to obtain the corresponding processing mode according to the fault signal received, and when the found processing mode is the mode for emergency stopping all the robots in the site, the server determines that all the robots in the site need to be controlled to emergency stop. In the present example, the fault processing list is provided in the server, and the server judges by looking up in the list whether all the robots in the site need to be controlled to emergency stop, which has the advantages of high operation efficiency, simple computation, and easy implementation.

In Step 106, if it is judged through Step 104 that all the robots in the site need to be controlled to emergency stop, the server detects the current position and the moving speed of each of the robots in the site, and allocates the position point in the site for each of the robots as the respective emergency stop position according to the current position and the moving speed of each of the robots. In the above, the step of allocating the position point in the site for each of the robots as the respective emergency stop position according to the current position and the moving speed of each of the robots includes the following process: (1) determining a first emergency stop range of the current robot according to a preset radius, with the current position of current robot as a center of circle; (2) searching in the first emergency stop range to determine whether there are spare position points; (3) if yes, analyzing time periods for the current robot to move respectively to the spare position points according to the moving speed of the current robot, selecting a spare position point needing the shortest time period as the emergency stop position of the current robot, and if not, enlarging the first emergency stop range according to a set size, repeating the above searching and analyzing actions for the enlarged first emergency stop range, until the emergency stop position of the current robot is determined.

Specifically, in the process (1), the server firstly determines the first emergency stop range of the current robot according to the preset radius, e.g. 100 cm, with the current position of the current robot as a center of circle. In the process (2), the server searches in the first emergency stop range determined in the above to determine whether there are spare position points that are not allocated to other robots. In the process (3), if the server finds the spare position points which are plural, the server calculates time periods required for the current robot to move respectively to the spare position points according to the moving speed of the current robot, and selects one spare position point requiring the shortest time period as the emergency stop position of the current robot. Of course, if only one spare position point is found in the first emergency stop range, this spare position point serves as the emergency stop position of the current robot. In the process (3), if finding no spare position point, the server enlarges, according to a set size, for example, 50 cm, the radius of the first emergency stop range, from 100 cm to 150 cm, and repeats the above searching and analyzing actions for the enlarged first emergency stop range, until one emergency stop position of the current robot is determined.

For each robot in the site, the server carries out the above processes (1), (2) and (3), and thus allocates the respective emergency stop position for each robot. In the present example, the respective emergency stop position is allocated for each robot in the manner of searching in a determined area range, which has the advantages of high working efficiency and quick allocation, and each robot in the site can be allocated with a suitable emergency stop position within a short period of time, thus facilitating the emergency stop of the robots.

In Step 108, controlling each of the robots to move to corresponding emergency stop position includes: calculating a moving direction and a moving distance of the current robot with respect to the corresponding emergency stop position; and determining a direction adjustment angle of the current robot according to the moving direction, and controlling the robot to move to the corresponding emergency stop position according to the direction adjustment angle and the moving distance. Specifically, the server firstly calculates the moving direction and the moving distance of the current robot with respect to the corresponding emergency stop position according to the current position of the current robot, then calculates the direction adjustment angle of the current robot according to this moving direction, and finally controls the robot to move to the corresponding emergency stop position according to the direction adjustment angle of the current robot and the moving distance of the current robot. In the present example, the server uses the same method to control each of the robots to move to respective corresponding emergency stop position. The method for controlling the robots to move in the present example has the advantages of simple control principle and easy implementation. In the present example, when the robots are controlled to move to the corresponding emergency stop positions, the robots can be controlled to move at a reduced speed, thus ensuring the moving safety of the robots.

Considering the situation that the faulty robot cannot move, in Step 108, controlling each of the robots to move to corresponding emergency stop position includes: controlling each of the robots to bypass a fault area corresponding to the faulty robot, to move to the respective emergency stop position. Specifically, if the faulty robot at this time cannot move or is out of control in movement, each of the other robots is controlled to bypass the fault area corresponding to the faulty robot, to move to the respective emergency stop position, thus avoiding collision with the faulty robot.

In Step 108: after the robots move to the corresponding emergency stop positions, the robots are each controlled to stop movement. Besides, before the robots are controlled to stop movement, the method of the present example further includes the following processes: (1) receiving position information returned by the current robot after moving to the corresponding emergency stop position; (2) calculating a distance between the current robot and the position identifier of the corresponding emergency stop position according to the position information; (3) adjusting a position of the current robot according to the distance, until the recognizer at the bottom of the current robot coincides with the position identifier of the corresponding emergency stop position. Specifically, in the process (1), the current robot, after moving to the corresponding emergency stop position, returns the position information to the server, and the server receives the position information. In the process (2), the server can perform encoding for each robot in an encoding manner, and correspondingly perform encoding on the emergency stop position and the position identifier for each robot, and the server is further stored in advance with position information of the position identifiers corresponding to individual robots. After receiving the position information returned by the current robot, the server can find the position information of the position identifier corresponding to the current robot according to a code of the current robot. The server calculates the distance between the current robot and the corresponding position identifier according to the received position information and the position information of the position identifier corresponding to the current robot. In the process (3), the server sends a control command to the robot according to the calculated distance, to control the robot to adjust its own position, until a center of the recognizer at the bottom of the current robot coincides with a center of the corresponding position identifier. In the present example, through the above processes, the server can finely adjust the position of the robot, such that the recognizer of the robot precisely coincides with the position identifier, thus ensuring that the robot stays in a precise position. In the present example, the server uses the same fine-adjustment action for each robot, thus ensuring that each robot precisely stays in respective emergency stop position.

Besides, the method of the present example further includes: planning a moving route for each robot according to multiple position points; determining, when all the robots in the site need to be controlled to emergency stop, a position point closest to the current robot on the moving route of the current robot as the emergency stop position of the current robot; and controlling the current robot to move to this emergency stop position. Specifically, since multiple position points are arranged in the site where the robots work, in the present example, the moving route can be planned for each robot, and this moving route is formed by serially connecting various position points. If the current robot needs to immediately emergency stop when moving in the moving route, the position point closest to the current robot on the moving route of the current robot serves as the emergency stop position of the current robot, and the current robot is controlled to move to this emergency stop position. In the present example, the emergency stop method, in which the emergency stop position is determined through the moving route, is simple, easy, and highly practicable, and facilitates re-start of the robots.

Figure 2:
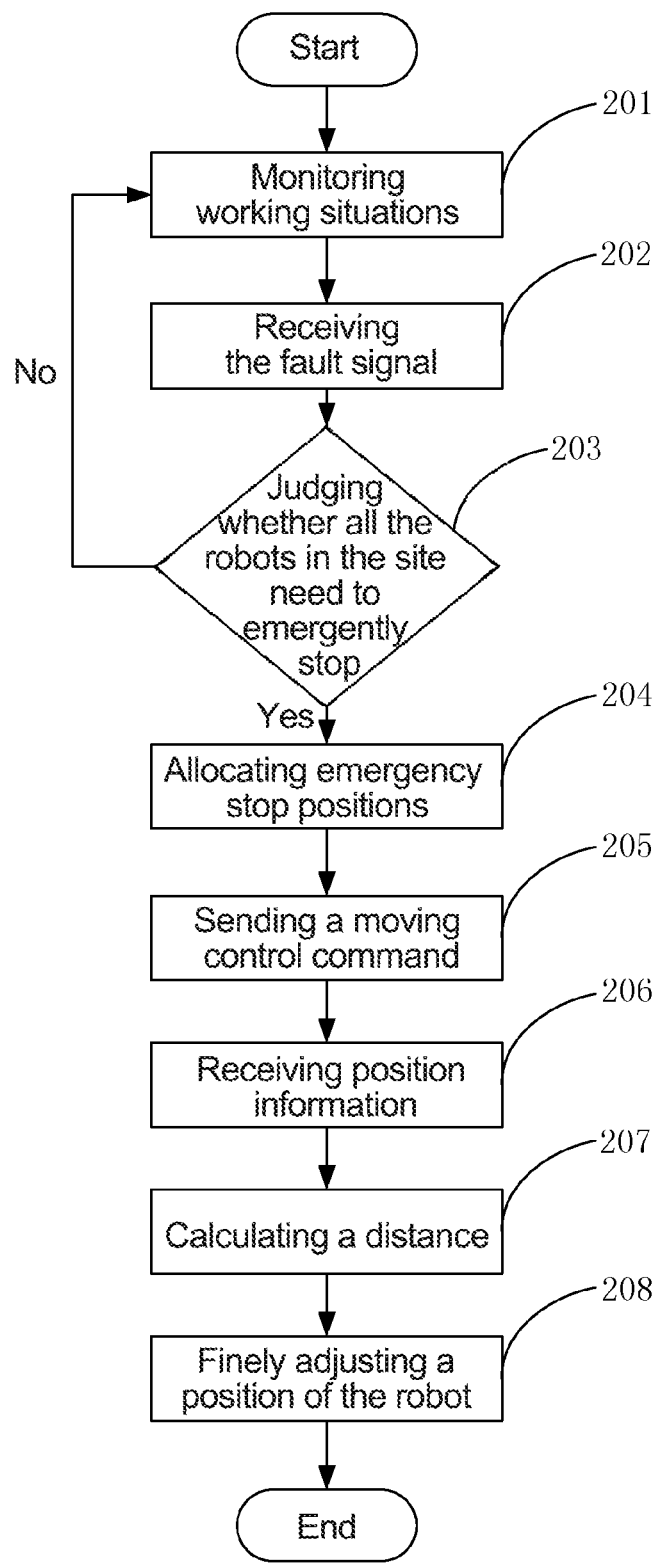
FIG. 2 shows a second flow chart of the method for controlling a number of robots to emergency stop provided in First Example of the present disclosure.

According to the above method for controlling a number of robots to emergency stop, embodiments of the present disclosure further provide another method for controlling a number of robots to emergency stop as shown in FIG. 2, and this method includes the following steps:

Step 201, monitoring, by the server, the working situations of the robots;

Step 202, receiving, by the server, the fault signal returned by the robots;

Step 203, judging, by the server, whether all the robots need to be controlled to emergency stop, according to the fault signal, wherein if yes, Step 204 is performed, and if not, Step 201 is performed;

Step 204, allocating, by the server, the corresponding emergency stop positions for all the robots in the site;

Step 205, sending, by the server, a moving control command to each robot according to the emergency stop position of each robot, to control each robot to move to respective emergency stop position;

Step 206, receiving, by the server, a current position of each robot, when the robot moves to the emergency stop position;

Step 207, calculating the distance between each robot and the position identifier of the corresponding emergency stop position according to the current position of each robot; and Step 208, finely adjusting, by the server, the position of each robot according to the distance calculated in Step 207, such that the center of the recognizer of each robot coincides with the center of the corresponding position identifier.

In practical operations, the robot also can automatically recognize the position identifier of the position point using the recognizer on the bottom, thus the robot automatically adjusts, when moving near to the position point, the center of the recognizer to coincide with the center of the position identifier, thus operations of the server are simplified, and the degree of automation of the robot is enhanced.

To sum up, with the method for controlling a number of robots to emergency stop provided in the present example, when faults occur to certain robots in the site, all the robots in the site can be immediately controlled to emergency stop, thus preventing the faulty robots from colliding with other robots, and further avoiding mutual collision between the great number of robots in the site.

A person skilled in the art should understand that when the robots are controlled by the server to start to work, the robots should be located in respective preset positions, and if the robots are randomly located in any positions in the work site, they can hardly enter the working state immediately. Therefore, in practical applications, when faults occur to certain robots in the site, if all the robots in the site are immediately ordered to stop in the current positions, it is unfavorable to subsequent start of the robots. With the method of the present example, when faults occur to certain robots in the site, all the robots can be controlled to stop in the respective emergency stop positions (equivalent to respective preset positions), which processing manner facilitates re-starting of the robots, and makes it convenient for all the robots to be capable of immediately entering the working state next time.

Second Example

Figure 3:
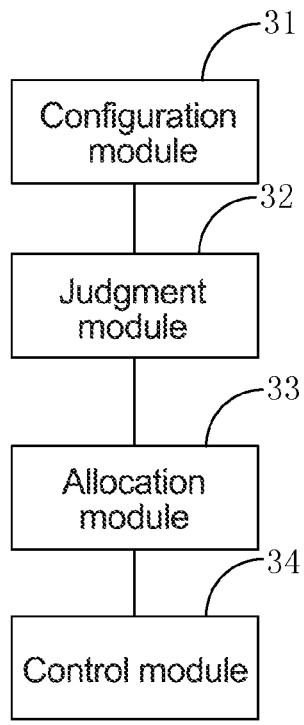
FIG. 3 shows a first structural schematic view of a device for controlling a number of robots to emergency stop provided in Second Example of the present disclosure.

Corresponding to the above First Example, a device for controlling a number of robots to emergency stop of Second Example of the present disclosure is further provided, for carrying out the above method. As shown in FIG. 3, the device for controlling a number of robots to emergency stop includes:

a configuration module 31, configured to arrange multiple position points in a site where the robots work, configure position identifiers respectively for the multiple position points, and provide a recognizer for recognizing the position identifier at a bottom of each robot;

a judgment module 32, configured to monitor working situations of the robots in the site, and judge, when a fault signal reported by the robots is detected, whether all the robots in the site need to be controlled to emergency stop according to the fault signal;

an allocation module 33, configured to detect a current position and a moving speed of each of the robots if all the robots in the site need to be controlled to emergency stop and allocate a position point in the site for each of the robots as respective emergency stop position according to the current position and the moving speed of each of the robots; and a control module 34, configured to control each of the robots to move to a corresponding emergency stop position, and control each of the robots to stop movement after the robot moves to the corresponding emergency stop position.

In the example of the present disclosure, firstly the position points are arranged in the site, then it is judged whether all the robots in the site need to emergency stop according to the fault situation of the robots, and when all the robots in the site need to emergency stop, the position point in the site is allocated for each robot as the emergency stop position of the robot, and finally, the robots are controlled to move to respective emergency stop positions. With the device of the present example, when faults occur to certain robots in the site, all the robots in the site can be controlled to emergency stop, thus preventing the faulty robots from colliding with other robots, and further avoiding mutual collision between the great number of robots in the site.

In the present example, the judgment module 32 includes: a look-up unit, configured to look up for a processing mode corresponding to the fault signal in a preset fault processing list; a determination unit, configured to determine, when the found processing mode is a mode for emergency stopping all the robots in the site, that all the robots in the site need to be controlled to emergency stop. In the present example, the fault processing list is set in the server, and the server judges by looking up the list whether all the robots in the site need to be controlled to emergency stop, which has the advantages of high operation efficiency, simple computation, and easy implementation.

In the present example, the allocation module 33 includes: a range determination unit, configured to determine a first emergency stop range of the current robot according to a preset radius, with the current position of the current robot as a center of circle; a searching unit, configured to search in the first emergency stop range to determine whether there are spare position points; a selection unit, configured to analyze, if there are spare position points, time periods for the current robot to move to the spare position points according to the moving speed of the current robot respectively, and select a spare position point needing the shortest time period as the emergency stop position of the current robot, and to enlarge, if there are no spare position points, the first emergency stop range according to a set size, and repeat the searching and analyzing actions for the enlarged first emergency stop range, until the emergency stop position of the current robot is determined. In the present example, the respective emergency stop position is allocated for each robot in the manner of determining an area range and searching, which has the advantages of high working efficiency and quick allocation. Each robot in the site can be allocated with a suitable emergency stop position within a short period of time, thus facilitating the emergency stop of the robots.

In the present example, the control module 34 includes: a calculation unit, configured to calculate a moving direction and a moving distance of the current robot with respect to the corresponding emergency stop position; and a movement control unit, configured to determine a direction adjustment angle of the current robot according to the moving direction, and control the robot to move to the corresponding emergency stop position according to the direction adjustment angle and the moving distance. The control module 34 in the present example has the advantages of simple control principle and easy implementation. In the present example, when the robots are controlled to move to the corresponding emergency stop positions, the robots can be controlled to move at a reduced speed, thus ensuring moving safety of the robots.

Figure 4:
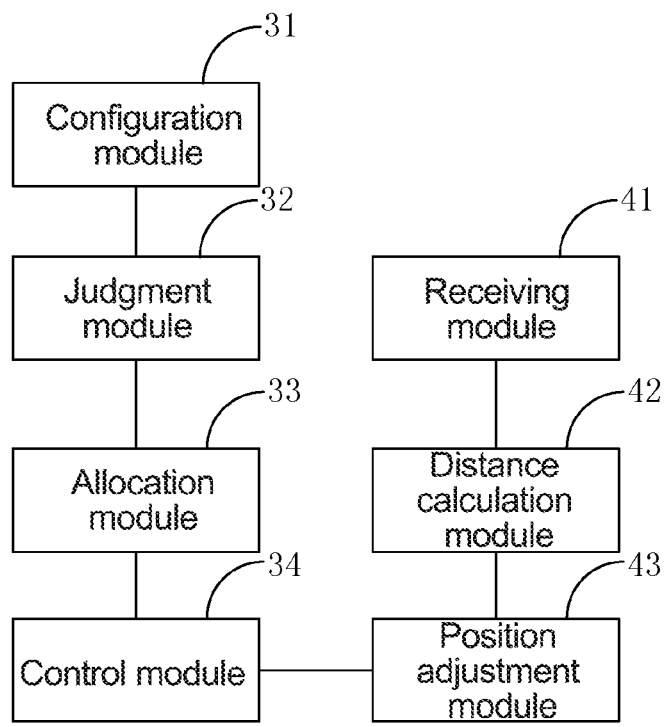
FIG. 4 shows a second structural schematic view of the device for controlling a number of robots to emergency stop provided in Second Example of the present disclosure.

As shown in FIG. 4, the device in the present example further includes: a receiving module 41, configured to receive position information returned by the current robot after moving to the corresponding emergency stop position; a distance calculation module 42, configured to calculate a distance between the current robot and the position identifier of the corresponding emergency stop position according to the position information; and a position adjustment module 43, configured to adjust a position of the current robot according to the above distance, until the recognizer at the bottom of the current robot coincides with the position identifier of the corresponding emergency stop position. In the present example, through the receiving module 41, the distance calculation module 42 and the position adjustment module 43, the positions of the robots can be finely adjusted, such that the recognizers of the robots precisely coincide with the corresponding position identifiers, thus ensuring that the robots stay in precise positions.

To sum up, with the method and the device for controlling a number of robots to emergency stop provided in the examples, when faults occur to certain robots in the site, all the robots in the site can be immediately controlled to emergency stop, thus preventing the faulty robots from colliding with other robots, and further avoiding mutual collision between the great number of robots in the site.

The device for controlling a number of robots to emergency stop provided in the example of the present disclosure can be specific hardware on an apparatus or software or firmware or the like mounted on an apparatus. The device provided in the example of the present disclosure is the same as the preceding method example in the implementation principle and resulting technical effect, and for the sake of conciseness, reference can be made to corresponding contents in the preceding method example for contents which are not mentioned in the device example. A person skilled in the art should clearly know that for the sake of descriptive convenience and preciseness, reference can be made to corresponding processes of the above method example for specific working processes of the system, device and units described in the preceding, which will not be repeated herein.

In the examples provided in the present disclosure, it should be understood that the device and the method disclosed also can be implemented in other ways. The example for the device described above is merely illustrative, for example, the division of the units is merely a type of division of logical functions, but there may be other way of division in practical implementation, for another example, a plurality of units or assemblies can be combined with or integrated into another system, or some features can be omitted, or not executed. Another point is that the shown or discussed mutual coupling or direct coupling or communication can be realized through some communication interfaces, and indirect coupling or communication of the devices or units can be in an electrical form, mechanical form or other forms.

The units described as separate parts may be or also may not be physically separated, the parts shown as units may be or also may not be physical units, i.e., they can be located at one place, or also can be distributed on a plurality of network units. The object of the solution of the present examples can be realized by selecting part or all the units thereof as actually required.

Besides, various functional units in the examples provided in the present disclosure can be integrated into one processing unit, or various units also can exist in a physically independent way, and two or more than two units also can be integrated into one unit.

When the function is realized in a form of software functional unit and is sold or used as an individual product, it can be stored in one computer readable storage medium. Based on such understanding, the technical solution of the present disclosure essentially or the part making contribution to the prior art or all or part of this technical solution can be embodied in a form of a software product, and this computer software product is stored in one storage medium, including several instructions used to make one computer device (which can be a personal computer, a sever or a network device etc.) execute all or part of the steps of the methods of various examples of the present disclosure. The aforementioned storage medium includes various media that can store program codes, such as U disk, mobile hard disk, Read-Only Memory (ROM), Random Access Memory (RAM), diskette or compact disk and so on.

It should be noted that similar reference signs and letters represent similar items in the following figures, therefore, once a certain item is defined in one figure, it is not needed to be further defined or explained in subsequent figures, besides, terms such as "first", "second" and "third" are merely for distinctive description, but should not be construed as indicating or implying importance in relativity.

Finally, it is to be explained that the above-mentioned examples are merely specific embodiments of the present disclosure for explaining the technical solutions of the present disclosure, rather than limiting the present disclosure, and the scope of protection of the present disclosure is not limited thereto. While the detailed description is made to the present disclosure with reference to the above-mentioned examples, a person ordinarily skilled in the art should understand that within the technical range disclosed in the present disclosure, any one skilled in the art still can modify the technical solutions disclosed in the preceding examples or can readily think of variations, or make equivalent substitutions to part of the technical features therein. These modifications, variations or substitutions will not make the corresponding technical solutions essentially depart from the spirit and scope of the technical solutions of the examples of the present disclosure, and all should be covered within the scope of protection of the present disclosure. Therefore, the scope of protection of the present disclosure should be based on the scope of protection of the claims.

The invention claimed is:

1. A method for controlling a number of robots to emergency stop, comprising steps of:
arranging multiple position points in a site where the robots work, configuring position identifiers respectively for the multiple position points, and providing a recognizer at a bottom of each robot, with the recognizer configured for recognizing the position identifier of the robot; and monitoring working situations of the robots in the site, and judging, when a fault signal reported by the robot(s) is detected, whether all the robots in the site need to be controlled to emergency stop, according to the fault signal, wherein if yes, a current position and a moving speed of each of the robots are detected, and each of the robots is allocated with a position point in the site as a respective emergency stop position, according to the current position and the moving speed of each of the robots, each of the robots is controlled to move to a corresponding emergency stop position, and each of the robots is controlled to stop movement after the robot moves to the corresponding emergency stop position, wherein the step that each of the robots is controlled to move to a corresponding emergency stop position comprises:

calculating a moving direction and a moving distance of a current robot with respect to the corresponding emergency stop position; and determining a direction adjustment angle of the current robot according to the moving direction, and controlling the robot to move to the corresponding emergency stop position according to the direction adjustment angle and the moving distance.

2. The method according to claim 1, wherein the step of judging whether all the robots in the site need to be controlled to emergency stop according to the fault signal comprises:

looking up a processing mode corresponding to the fault signal in a preset fault processing list; and determining, when the found processing mode is a mode for emergency stopping all the robots in the site, that all the robots in the site need to be controlled to emergency stop.

3. The method according to claim 2, wherein before each of the robots is controlled to stop movement, the method further comprises:

receiving position information returned by a current robot after moving to the corresponding emergency stop position;

calculating a distance between the current robot and a position identifier of the corresponding emergency stop position according to the position information; and adjusting a position of the current robot according to the distance, until the recognizer at a bottom of the current robot coincides with the position identifier of the corresponding emergency stop position.

4. The method according to claim 1, wherein the step that each of the robots is allocated with a position point in the site as a respective emergency stop position according to the current position and the moving speed of each of the robots comprises:

determining a first emergency stop range of a current robot according to a preset radius, with a current position of the current robot as a center of circle; and searching in the first emergency stop range to determine whether there are spare position points, wherein if yes, time periods for the current robot to move respectively to the spare position points are analyzed according to a moving speed of the current robot, a spare position point needing a shortest time period is selected as the emergency stop position of the current robot, and if not, the first emergency stop range is enlarged according to a set size, the searching and the analyzing are repeated for the enlarged first emergency stop range, until the emergency stop position of the current robot is determined.

5. The method according to claim 4, wherein before each of the robots is controlled to stop movement, the method further comprises:

receiving position information returned by a current robot after moving to reach the corresponding emergency stop position;

calculating a distance between the current robot and a position identifier of the corresponding emergency stop position according to the position information; and adjusting a position of the current robot according to the distance, until the recognizer at a bottom of the current robot coincides with the position identifier of the corresponding emergency stop position.

6. The method according to claim 1, wherein before each of the robots is controlled to stop movement, the method further comprises:

receiving position information returned by a current robot after moving to reach the corresponding emergency stop position;

calculating a distance between the current robot and a position identifier of the corresponding emergency stop position according to the position information; and adjusting a position of the current robot according to the distance, until the recognizer at a bottom of the current robot coincides with the position identifier of the corresponding emergency stop position.

7. A device for controlling a number of robots to emergency stop, comprising:

a configuration module, configured to arrange multiple position points in a site where the robots work, configure position identifiers respectively for the multiple position points, and provide a recognizer at a bottom of each robot, with the recognizer configured for recognizing the position identifier of the robot;

a judgment module, configured to monitor working situations of the robots in the site, and judge, when a fault signal reported by the robot(s) is detected, whether all the robots in the site need to be controlled to emergency stop, according to the fault signal;

an allocation module, configured to detect a current position and a moving speed of each of the robots if all the robots in the site need to be controlled to emergency stop, and allocate a position point in the site for each of the robots as a respective emergency stop position according to the current position and the moving speed of each of the robots; and a control module, configured to control each of the robots to move to a corresponding emergency stop position, and control each of the robots to stop movement after the robot moves to the corresponding emergency stop position, wherein the control module comprises:

a calculation unit, configured to calculate a moving direction and a moving distance of a current robot with respect to the corresponding emergency stop position; and a movement control unit, configured to determine a direction adjustment angle of the current robot according to the moving direction, and control the robot to move to the corresponding emergency stop position according to the direction adjustment angle and the moving distance.

8. The device according to claim 7, wherein the judgment module comprises:

a look-up unit, configured to look up a processing mode corresponding to the fault signal in a preset fault processing list; and a determination unit, configured to determine, when the found processing mode is a mode for emergency stopping all the robots in the site, that all the robots in the site need to be controlled to emergency stop.

9. The device according to claim 8, further comprising:

a receiving module, configured to receive position information returned by a current robot after moving to reach the corresponding emergency stop position;

a distance calculation module, configured to calculate a distance between the current robot and a position identifier of the corresponding emergency stop position according to the position information; and a position adjustment module, configured to adjust a position of the current robot according to the distance, until the recognizer at a bottom of the current robot coincides with the position identifier of the corresponding emergency stop position.

10. The device according to claim 7, wherein the allocation module comprises:

a range determination unit, configured to determine a first emergency stop range of a current robot according to a preset radius, with a current position of the current robot as a center of circle;

a searching unit, configured to search in the first emergency stop range to determine whether there are spare position points; and a selection unit, configured to analyze, if there are spare position points, time periods for the current robot to move respectively to the spare position points according to the moving speed of the current robot, and select a spare position point needing a shortest time period as the emergency stop position of the current robot, and to enlarge, if there are no spare position points, the first emergency stop range according to a set size, and repeat the searching and the analyzing in the enlarged first emergency stop range, until the emergency stop position of the current robot is determined.

11. The device according to claim 10, further comprising:

a receiving module, configured to receive position information returned by a current robot after moving to reach the corresponding emergency stop position;

a distance calculation module, configured to calculate a distance between the current robot and a position identifier of the corresponding emergency stop position according to the position information; and a position adjustment module, configured to adjust a position of the current robot according to the distance, until the recognizer at a bottom of the current robot coincides with the position identifier of the corresponding emergency stop position.

12. The device according to claim 7, comprising:

a receiving module, configured to receive position information returned by a current robot after moving to reach the corresponding emergency stop position;

a distance calculation module, configured to calculate a distance between the current robot and a position identifier of the corresponding emergency stop position according to the position information; and a position adjustment module, configured to adjust a position of the current robot according to the distance, until the recognizer at a bottom of the current robot coincides with the position identifier of the corresponding emergency stop position.

* * * * *